United States Patent
Halperin

(10) Patent No.: US 10,921,780 B2
(45) Date of Patent: Feb. 16, 2021

(54) NESTING PROCEDURES AND MANAGEMENT OF 3D PRINTING

(71) Applicant: ASSEMBRIX LTD., Petach Tikva (IL)

(72) Inventor: Dan Halperin, Tel Aviv (IL)

(73) Assignee: ASSEMBRIX LTD., Petach Tikva (IL)

( * ) Notice: Subject to any disclaimer, the term of this patent is extended or adjusted under 35 U.S.C. 154(b) by 156 days.

(21) Appl. No.: 15/214,488

(22) Filed: Jul. 20, 2016

(65) Prior Publication Data

US 2018/0024517 A1 Jan. 25, 2018

(51) Int. Cl.
G05B 19/4099 (2006.01)
B33Y 50/02 (2015.01)

(52) U.S. Cl.
CPC .......... *G05B 19/4099* (2013.01); *B33Y 50/02* (2014.12); *G05B 2219/35162* (2013.01); *G05B 2219/49007* (2013.01)

(58) Field of Classification Search
CPC ...... G05B 17/02; G05B 13/041; G05B 19/35; G05B 2219/35162; G05B 2219/49007; B33Y 50/02; B29C 67/0088; B41J 2/01; B41J 2/175; G06F 9/3861; G06F 9/467
USPC .......................................................... 700/98
See application file for complete search history.

(56) References Cited

U.S. PATENT DOCUMENTS

| 6,980,934 | B1 * | 12/2005 | Sadovnik ............ G06F 17/5004 206/505 |
| 2005/0122346 | A1 * | 6/2005 | Horn ...................... G06F 17/50 345/629 |
| 2007/0233298 | A1 | 10/2007 | Heide et al. |
| 2012/0242007 | A1 * | 9/2012 | Coeck .................... B33Y 10/00 264/401 |

(Continued)

FOREIGN PATENT DOCUMENTS

| WO | WO 2014/141273 | 9/2014 |
| WO | WO 2016/088118 | 6/2016 |

OTHER PUBLICATIONS

Vasquez-Gomez, J.I., Sucar, L.E. and Murrieta-Cid, R., 2017. View/state planning for three-dimensional object reconstruction under uncertainty. Autonomous Robots,nbsp;41(1), pp. 89-109. Published online Dec. 23, 2015. (Year: 2015).*

(Continued)

*Primary Examiner* — Rocio Del Mar Perez-Velez
*Assistant Examiner* — Alicia M. Choi
(74) *Attorney, Agent, or Firm* — Pearl Cohen Zedek Latzer Baratz LLP

(57) ABSTRACT

Methods of nesting parts for 3D printing and of modularly managing the 3D printing as well as corresponding modules are provided. Methods split received part models into model batches, and repeatedly, set consecutive model batches into printing space(s) that are being gradually filled, by defining, for each part model in the model batch, a roadmap with respect to the occupied space and a set of positioning rules, (Continued)

and independently from the other part models in the model batch, and optimizing, in parallel for the part models in the model batch, a part positioning scheme for the model batch parts. The methods may further manage the allocation of printing spaces with respect to incoming printing requests to incorporate the respective parameters into the parameters of the nesting process. The methods exhibit a high level of process parallelization, at all levels of space and parts' allocation and nesting.

21 Claims, 5 Drawing Sheets

(56) References Cited

U.S. PATENT DOCUMENTS

| | | | |
|---|---|---|---|
| 2014/0052415 A1* | 2/2014 | Baran | G06F 17/50 703/1 |
| 2014/0177008 A1* | 6/2014 | Raymond | B42D 25/324 358/3.28 |
| 2014/0319716 A1 | 10/2014 | Shtilerman | |
| 2014/0350898 A1* | 11/2014 | Tschanz | G05B 19/4097 703/1 |
| 2015/0057784 A1* | 2/2015 | Butler | B29C 67/0088 700/119 |
| 2016/0311165 A1* | 10/2016 | Mark | B33Y 10/00 |
| 2017/0173889 A1* | 6/2017 | Thomas-Lepore | G06F 21/31 |
| 2017/0239719 A1* | 8/2017 | Buller | G05B 19/4099 |
| 2017/0269575 A1 | 9/2017 | Halperin et al. | |
| 2018/0133969 A1* | 5/2018 | Huang | B33Y 50/00 |
| 2018/0165730 A1* | 6/2018 | Norman | G06Q 30/06 |
| 2019/0009472 A1* | 1/2019 | Mark | B29C 64/393 |

OTHER PUBLICATIONS

Kondo, K., 1991. Motion planning with six degrees of freedom by multistrategic bidirectional heuristic free-space enumeration. IEEE Transactions on Robotics and Automation, 7(3), pp. 267-277. (Year: 1991).*

Chen X, Zhang H, Lin J, Hu R, Lu L, Huang QX, Benes B, Cohen-Or D, Chen B. Dapper: decompose-and-pack for 3D printing. ACM Trans. Graph.. Nov. 1, 2015; 34(6):213-1. (Year: 2015).*

Zhang Y, Gupta RK, Bernard A. Two-dimensional placement optimization for multi-parts production in additive manufacturing. Robotics and Computer-Integrated Manufacturing. Apr. 1, 2016;38:102-17. (Year: 2016).*

Sertac Karaman and Emilio Frazzoli "Sampling-based algorithms for optimal motion planning" vol. 30 issue: 7, pp. 846-894, published online: Jun. 22, 2011.

J.J. Kuffner and S.M. Lavalle "RRT-connect: An efficient approach to single-query path planning" In Proc. 2000 IEEE Int'l Conf. on Robotics and Automation (ICRA 2000), pp. 995-1001, Jan. 2000.

Ralf Heckmann and Thomas Lengauer "A simulated annealing approach to the nesting problem in the textile manufacturing industry", vol. 57, Issue 1, pp. 103-133, Dec. 1995.

International Search Report of PCT Application No. PCT/IL2015/050797 dated Dec. 2, 2015.

Bugdayci et al., "Analysis of Slicing-Tools for Fused Deposition Modeling 3D-Printers and comparison of different printers", Fachstudie Nr. 191, University of Stuttgart, Jul. 15, 2014.

Nobuyuki Umetani, Ryan Schmidty "Cross-sectional Structural Analysis for 3D Printing Optimization" ACM SIGGRAPH Asia 2013 Technical Brief.

Paul Alexander ,Seth Allen Debasish Dutta "Part orientation and build cost determination in layered manufacturing" vol. 30, Issue 5, Apr. 1998, pp. 343-356.

* cited by examiner

NESTING PROCEDURES AND MANAGEMENT OF 3D PRINTING

BACKGROUND OF THE INVENTION

1. Technical Field

The present invention relates to the field of 3D printing, and more particularly, to parts nesting and management methods.

2. Discussion of Related Art

Three dimensional printing (3D Printing, or 3DP) denotes a broad range of technologies for creating three-dimensional objects by applying material one layer after the other, according to specification given as a digital model. The field is often called additive manufacturing (AM) since material is added to the growing object (as opposed to subtractive methods such as numerical control machining). There are a variety of technologies that fall under this category, but most of them share the characteristics that the desired object is produced layer by layer. 3D printing may be carried out with various materials, such as plastic materials, ceramic materials, metals, etc. The ordering of parts in a printing space is termed nesting, and its optimization is a major challenge in the field of 3D printing.

WIPO Patent Application No. PCT/IL2015/050797, which is incorporated herein by reference in its entirety, teaches the optimization of model orientation in 3D printing.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a nesting method for 3D printing, the method comprising: splitting a plurality of received part models into a plurality of model batches, setting a first batch of part models into a specified 3D printing space, and repeatedly, setting consecutive model batches into a specified occupied space, defined by the specified 3D printing space and the formerly set model batches, by: defining, for each part model in the model batch, a roadmap with respect to the occupied space and a set of positioning rules, and independently from the other part models in the model batch, and optimizing, in parallel for the part models in the model batch, a part positioning scheme for the model batch parts.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
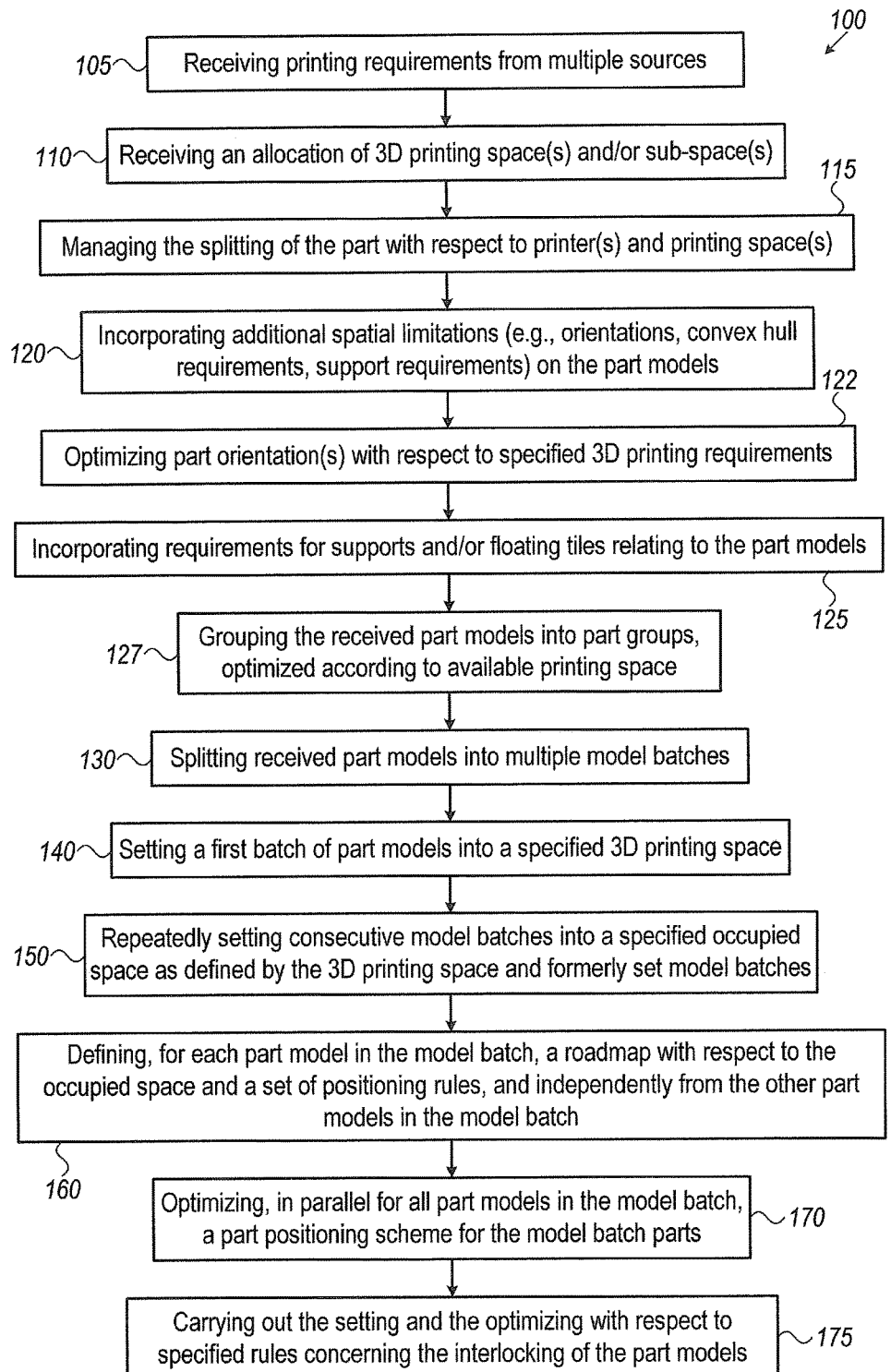
FIG. 1 is a high level schematic flowchart illustrating a method for 3D printing, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Prior to the detailed description being set forth, it may be helpful to set forth definitions of certain terms that will be used hereinafter. The terms "part" and "model" are used in this application interchangeably to refer to parts that are to be printed by a 3D printer and their models as described by any kind of software. The terms "batch" and "set" are used in this application interchangeably to refer to a group of part and/or their models. The term "location" as used in this application refers to the position and orientation of a rigid body, such as a part or a model thereof. The term "enclosing volume" as used in this application refers to the enclosing volume around a part model, which may be referred to by different definitions, such as the oriented bounding box or OBB, namely a small box enclosing the part, the model's convex hull and/or parameters relating thereto by various metrics. It is noted that the term "enclosing volume" and "OBB" may be used with respect to the part model as a whole, or with respect to sum of enclosing volumes or OBBs for multiple elements of the part model (a distinction related to the resolution of the computation of the respective enclosing volume). The term "configuration" as used in this application refers to a set of parts or models with corresponding locations to each of the parts or models.

Methods of nesting parts for 3D printing and of modularly managing the 3D printing volume as well as corresponding modules are provided. Methods split received part models into model batches, and repeatedly, set consecutive model batches into printing space(s) that are being gradually filled, by defining, for each part model in the model batch, a roadmap with respect to the occupied space and a set of positioning rules, and independently from the other part models in the model batch, and optimizing, in parallel for the part models in the model batch, a part positioning scheme for the model batch parts. The methods may further manage the allocation of printing spaces with respect to incoming printing requests to incorporate the respective parameters into the parameters of the nesting process. The methods exhibit a high level of process parallelization, at all levels of space and parts' allocation and nesting. It is noted that the following methods and modules are applicable to any type of part or model as well as to any type of 3D printer, any materials used thereby, as well as combinations thereof, as explained below.

FIG. 1 is a high level schematic flowchart illustrating a method 100 for 3D printing, according to some embodiments of the invention. Method 100 may be at least partially implemented by a system comprising a server computer having at least one processor and memory and one or more code sets stored in the memory and executed in the processor adapted to run, e.g., in a design or printing module, or as a web-based software service. Certain embodiments comprise computer program products comprising a computer readable storage medium having computer readable program embodied therewith and configured to carry out of the relevant stages of method 100. Method 100 may comprise a nesting method, as well as a modular 3D printing method and a 3D printing management method that incorporate the nesting method, described in detail below. Stages of method 100 may be carried out by a computer program product comprising a computer readable storage medium having computer readable program embodied therewith, the computer readable program may be configured to carry out respective stages of method 100.

Method 100 may comprise splitting a plurality of received part models into a plurality of model batches (stage 130) and setting a first batch of part models into a specified 3D printing space (stage 140), such as a 3D printing space allocated by a provider, a customer, or calculated according to specified requirements and parameters.

Method 100 further comprises nesting the parts into the 3D printing space by repeatedly, setting consecutive model batches into a specified occupied space, defined by the specified 3D printing space and the formerly set model batches (stage 150), by: (i) defining (stage 160), for each part model in the model batch, a roadmap with respect to the occupied space and a set of positioning rules, and independently from the other part models in the model batch, and (ii) optimizing (stage 170), in parallel for all part models in the model batch, a part positioning scheme for the model batch parts. The parallel optimizing may be carried out by applying PRM (probabilistic roadmap) and RRT (rapidly-exploring random tree) algorithms to the positioning schemes of the part models in each model batch, as explained below. It is noted that nesting may be carried out into a free subspace of the printer space and/or into an occupied subspace of the printer space, occupied with parts from earlier-positioned batches (see FIGS. 3A and 3B below for examples). In the latter case, the earlier-positioned parts are related to as obstacles in the nesting procedure.

Method 100 may comprise incorporating, into setting 140, 150 and optimizing 170, requirements for supports and/or floating tiles relating to the part models (stage 125). Method 100 may comprise carrying out setting 140, 150 and optimizing 170 with respect to specified rules concerning the interlocking of the part models (stage 175).

Defining 160 and optimizing 170 may be carried out repeatedly for different sets of roadmaps to yield a respective plurality of optimization scores, and the setting of the model batch parts is determined with respect to the optimization scores.

Method 100 may further comprise initially incorporating additional spatial limitations on the part models, the spatial limitations comprising at least one of: at least one preferred orientation for each part model, convex hull requirements relating to the part models, and support requirements relating to the part models (stage 120). For example, method 100 may comprise optimizing an orientation of at least one of the received part models with respect to specified 3D printing requirements, prior to the respective setting and optimizing (stage 122). For example, part model orientations may be optimized according to procedures taught in WIPO Patent Application No. PCT/IL2015/050797. It is noted that the orientation may be selected continuously and encompass any possible orientation, or may be selected discretely in steps of any required size. In particular, orientation angle steps may be selected to be few degrees or few tens of degrees, possibly 90° but not restricted thereto.

Method 100 may comprise incorporating, into setting 140, 150 and optimizing 170, requirements for supports and/or floating tiles relating to the part models (stage 125). Method 100 may comprise carrying out setting 140, 150 and optimizing 170 with respect to specified rules concerning the interlocking of the part models (stage 175).

Method 100 may further comprise grouping the received part models into a plurality of part groups prior to splitting 130, which is then carried out with respect to the part groups; and optimizing the grouping of the parts into the part groups with respect to printing requirements and occupied space of the part group (stage 127). The part groups may be e.g., identical, for example with respect to the volume enclosed by each group.

Method 100 may comprise a modular 3D printing method comprising receiving printing requirements from multiple sources (stage 105), receiving an allocation of 3D printing space(s) and/or sub-space(s) (stage 110), e.g., box-shaped sub-spaces which fill at least part of the 3D printing space, and carrying out the nesting method (e.g., stages 130-170) with respect to sub-space(s). Method 100 may comprise managing the splitting of the part with respect to printer(s) and printing space(s) (stage 115), e.g., by allocating an obtained ensemble of part models into a plurality of groups of part models, each group allocated to a respective (possibly box-shaped) sub-space, the allocation of the obtained ensemble into groups possibly being carried out concurrently with the setting of the part models into the respective box-shaped sub-spaces and the optimizing of the part positioning schemes. Method 100 may comprise a 3D printing management method comprising allocating an obtained ensemble of part models into a plurality of groups of part models, each group allocated to a respective 3D printer, and carrying out the nesting method with respect to at least one of the groups. The allocation of the obtained ensemble into groups may be carried out concurrently with the setting of the part models into the specified 3D printing space of the respective 3D printer and the optimizing of the part positioning schemes.

Method 100 is explained in the following, but is not limited to, the use of the following terms, concepts and algorithms. When referring to parts and part models in the following, it is noted that these may be set in specified optimized orientations and be accompanied by various support structures, connected or unconnected thereto, which are taken into account when performing the disclosed algorithms. It is noted that during the execution of the nesting algorithms, orientation and/or support parameters may be changed and their possible changes may be taken into account during the nesting itself (e.g., dimensions of floating tiles may change with changing orientation of the parts and/or with respect to adjacent models etc.). These considerations are not explicitly shown but are assumed to be applicable in a straightforward manner by a person skilled in the art, and are hence considered part of the present invention.

The term "general nesting constraints" or "GNC" as used in this application refers to a set of rules that the parts have to obey when placed in the printing space. Correspondingly the disclosed nesting procedures are also limited by the GNC. It is noted that GNC may comprise any of a number of sets of constraints, which may depend on the nature of the parts, the 3D printing methods, customer requirements etc. As a non-limiting example, GNC may comprise given minimal distance between parts and minimal distances between the parts and the edges of the printing space (e.g., printer's walls). The GNC may be defined globally, for all parts, or specifically, with different GNC for different parts (including definitions of specific distances between specific parts). The term "local nesting constraints" or "LNC" as used in this application refers to a set of rules that the parts have to obey when placed in a certain subspace of the printing space or to a set of rules that a certain part has to obey, overriding the GNC.

The term "allowable set of transformations" as used in this application refers to predefined spatial modifications of the part models such as translations, rotations and combinations thereof. The allowable set of transformations may be predefined for all parts or be specified part by part. Different allowable sets of transformations may apply to different parts. For example, the allowable sets of transformations may comprise six degrees of freedom (all translations and rotations), four degrees of freedom (all translations, but rotations with respect to one axis only) etc.

The term "roadmap" as used in this application refers to a graph that describes location availability for positioning a part within a given space, which may be determined according to various criteria. As a non-limiting example, the term "probabilistic roadmap" or "PRM" as used in this application refers to the roadmap as a graph that approximately describes available locations for a part within a given space. The graph may include starting node(s) and goal node(s) as well as many configuration nodes that represent allowable configurations of parts according to the GNC.

The algorithm nests a set P of parts, given also a set Q of parts already (nested) in fixed positions-and-orientations. It is noted that while parts of method 100 may implement concepts, algorithms and procedures that are also applicable to robot motion planning applications, the inventors have discovered that some of the algorithms in the field of motion planning, as well as modifications presented herein may be efficiently applicable to the 3D nesting challenges which relate to a completely different area of application, and are broadly unmet by current technologies.

Figure 2:
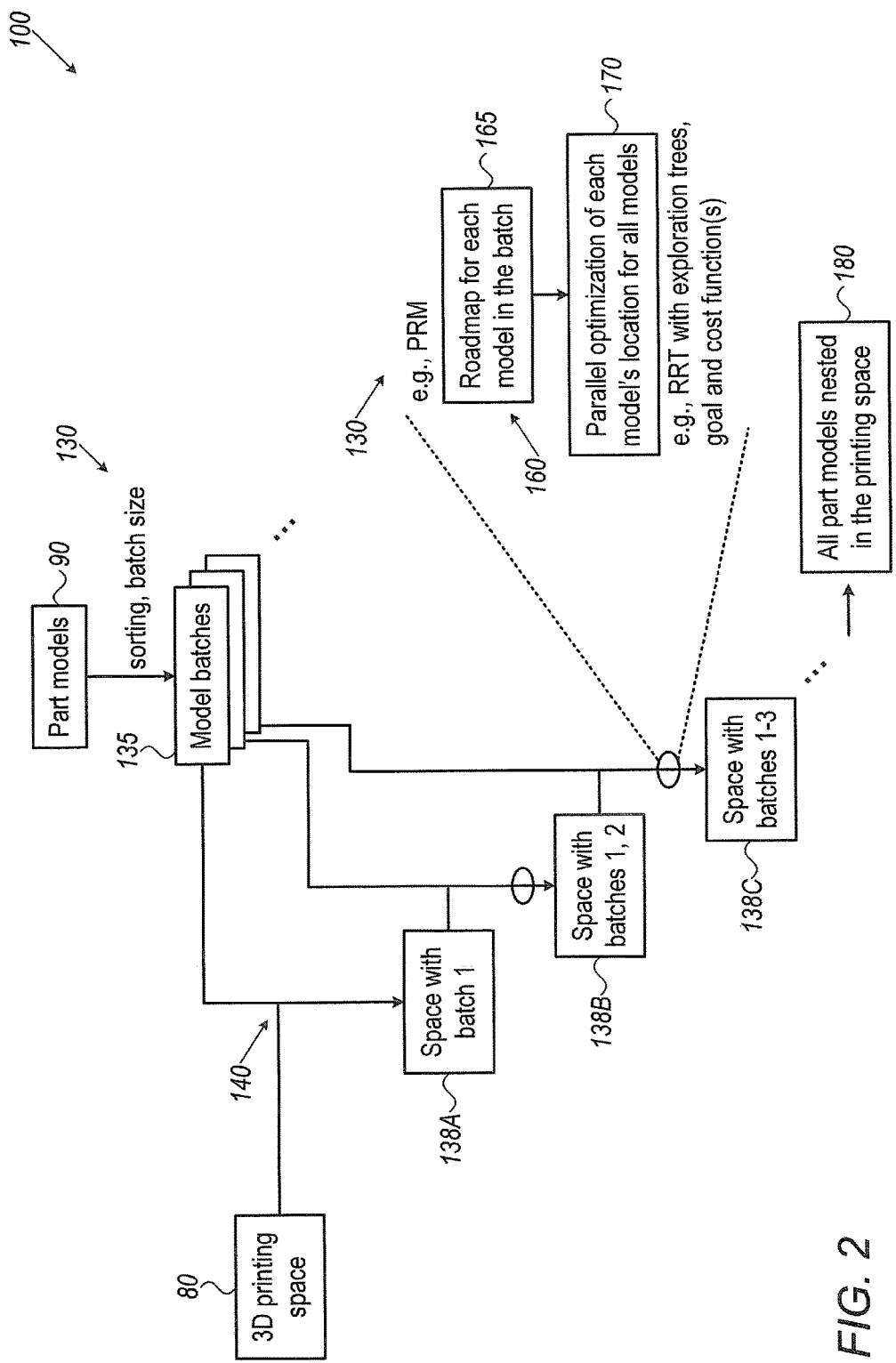
FIG. 2 is a high level schematic flowchart illustrating nesting method, according to some embodiments of the invention.

FIG. 2 is a high level schematic flowchart illustrating nesting method 100, according to some embodiments of the invention. Stages 130-170 are indicated schematically as well as the progress of the nesting process, as explained below in detail.

The PRMs may be constructed by any construction algorithm, typically involving iterative addition of configuration nodes that comply with the GNC according to specified rules; and be queried by any querying algorithm, typically applying multi-query structures. Examples for PRM and respective construction algorithms, e.g., PRM*, s-PRM*; see Sertac Karaman, Emilio Frazzoli: Sampling-based algorithms for optimal motion planning. I. J. Robotic Res. 30(7): 846-894 (2011). Examples for querying algorithm are algorithms from the RRT (rapidly exploring random tree) family, such as RRT-connect James J. Kuffner Jr., Steven M. LaValle: RRT-Connect: An Efficient Approach to Single-Query Path Planning, ICRA 2000: 995-1001.

Roadmaps 165 are exemplified by the probabilistic roadmaps denoted below as PRM(b,R) and relating to a part model b that is positioned in the space R which includes the former positioned (static) models within the printing space. Space R is the set of obstacles for PRM, including the already-nested parts. It is noted that PRM(b,R) may be constructed with respect to the allowable set of transformations (as defined above) for part b. The evaluation of each configuration may be carried out with respect to a goal function, such as the non-negative objective function F(c) that provides a value to each configuration c, in a non-limited example the maximal height of the part models of configuration c within the printing space. Alternatively or additionally, other values may be used for the optimization such as operational parameters of the printing process (e.g., amount of unused printing material), printing quality parameters, part production parameters and so forth. In the exemplary case of F(c) denoting the height of configuration c, the aim of optimization 170 may be minimizing F(c). The configurations may be evaluated by additional functions, for example a function OM(c) may be used to denote an estimate of the amount of overlap of the configuration c. The overlap may be defined in different ways (see e.g., in Lengauer 1995, A simulated annealing approach to the nesting problem in the textile manufacturing industry, Annals of Operations Research 57: 103-133), for example by referring to the proportion of arbitrarily selected points with the enclosed volumes of the parts, which are shared by the enclosed volumes of more than one part. The evaluation of the configurations may be carried out by using several goal functions, weighting different goal functions, including specific penalties in the evaluation of the goal functions (e.g., an overlap penalty based on OM(c) in the calculation of F(c)), etc.

Method 100 may receive a Q-configuration, namely a set Q of parts and their positions and orientations (complying with the GNC, or not, in the latter case a warning may be provided) and a set P of parts (part models) to be nested with respect to the locations of the fixed parts in the Q-configuration. In certain embodiments, the parts in P may have starting locations and a set of allowable transformations, constraints and/or possible placements or placement suggestions. Method 100 may output a specification of the optimized locations of the parts in P as they are set in Q, denoted as P∪Q, in which all the part models are pairwise interior disjoint and all parts of P respect the GNC. In certain cases, LNC may be defined for certain subspaces or for specific parts, and be set to override the GNC.

Method 100 may comprise sorting the parts in P according to some criterion (e.g., a size metric such as the size of the enclosing volume) and selecting the batches (130) according to the size order from large to small or according to any other defined order. The repeated setting consecutive model batches into a specified occupied space (150) is demonstrated below, in a non-limiting example. R denotes the nested space at the beginning of each such step (initially R=Q with R being the starting position for each consequent step namely 138A, 138B, 138C etc.) and B denotes the set of parts in the batch. Roadmap 165 such as PRM(b,R) is calculated for each part b in B to yield free nodes only (non-intersecting parts) and under the assumption of a maximal number of nodes (milestones) in roadmap 165 and/or computational parameters such as a maximal calculation time.

It is noted that the term "free" denotes nodes which include no collisions in R and no collisions with other parts in B. It is emphasized that the disclosed invention provides the user to explicitly control the spatial relations between part models, and particularly control the notorious obstacle in the prior art of avoiding part nesting schemes which prevent later separation of the parts, due to the setting of e.g., part within part, interlocked parts etc. One way to control this aspect is performing a post-processing test and re-nesting regions that exhibit such characteristics, another way is to require that the roadmap edges are all free, and other options involve criteria applied during the optimization of the models' locations.

Based on roadmap 165, a set S of seeds is computed, with each seed s being a configuration of every part b in B, where for part b the configuration is a node (milestone) in PRM (b,R), and corresponding trees are constructed from each seed s by applying the RRT algorithm to explore the configuration space. The trees are constructed by applying the RRT algorithm with respect to the occupied space with previously set items as defined in roadmap 165, e.g., as implicit products of respective PRMs (see below). It is noted that while in the PRMs nodes are free (the parts are pairwise disjoint), the RRT nodes may be not free (as they just describe proximity of configurations) and assigned a weight OM(n) which is zero if node n is free and positive value that is based on the amount of overlap in the enclosed volumes (e.g., OBB's) of the respective parts (and see above concerning function OM(c)). Seed s may be selected to be free, but is not necessarily so.

It is noted that the algorithms of the RRT family are a non-limiting example, as other algorithms may be used to search the configurations.

Following the nesting of each batch (e.g., according to the best goal function value and/or other criteria), the next batch may be nested using a similar procedure, until all part models are nested 180.

Figure 3A:
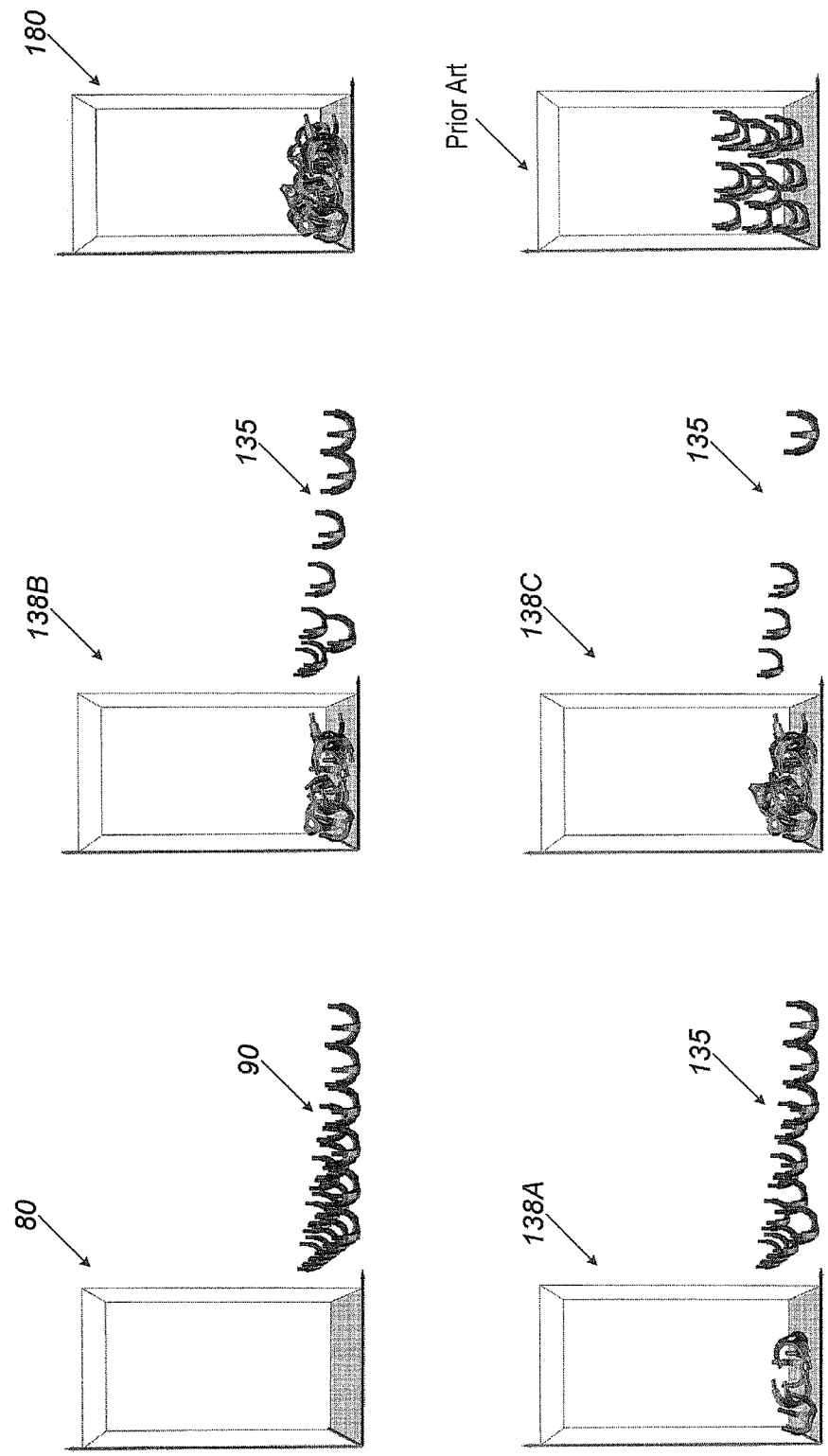
FIGS. 3A and 3B are high level schematic exemplary illustrations of the method and nesting efficiency improvements achieved using the method, according to some embodiments of the invention.
Figure 3B:
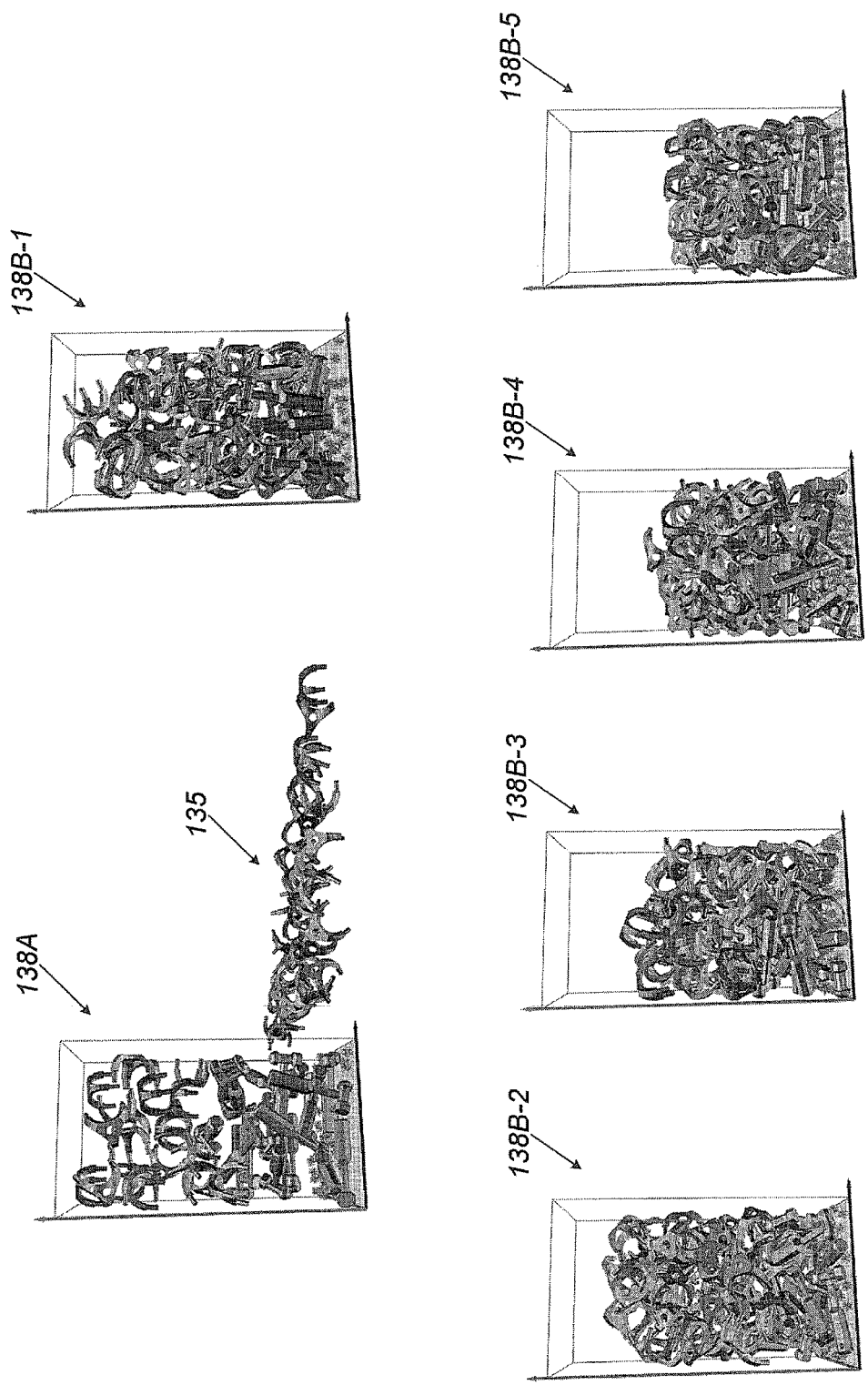

FIGS. 3A and 3B are high level schematic exemplary illustrations of method 100 and nesting efficiency improvements achieved using method 100, according to some embodiments of the invention. FIG. 3A schematically illustrates consecutive setting of batches 135 of parts 90 into printer space 80 and spaces with previously-set batches 138A, 138B, 138C (see FIG. 2 above), resulting in a nesting 180 of all parts 90. As comparison an image of a prior art printing scheme is shown, with parts set into the printing space according to their external hulls. Evidently, nesting method 100 provides a much more compact ordering of the parts (180) as compared with the prior art, leading to a much more efficient use of printing space and materials. FIG. 3B schematically illustrates the printer space with positioned parts, e.g., space with first batch 138A and parts of a consequent batch 135, with printer space with both batches of parts in increasing levels of nesting efficiencies 138B-1, 138B-2, 138B-3, 138B-4 and 138B-5, i.e., with the parts nested at increasing density, taking less and less printer space (e.g., height of the printer volume).

Method 100 provides a wide range of parallelization of the computation steps that enhance the efficiency and reduce the time required for performing the nesting. For example, multiple roadmaps may be calculated in parallel, different seeds are handles by different processes, computation of OM and F for different samples may be split among processes, tree construction may be parallelized, in certain cases the initial group of parts may be split is several sub-groups and each may be nested in an allocated subspace independently of the other subgroups—yielding additional parallelization opportunities. Method 100 may generally be carried out by one or more multi-processor computer(s) in which different processors handle different parallelized tasks.

Method 100 may be applied to a wide range of printing requirements, such as: nesting parts into a single printing space of a single 3D printer; nesting parts into multiple printing spaces of a same or multiple printing sessions of a single 3D printer; nesting parts into multiple printing spaces of a single 3D printer; and applying any of the above to multiple printers.

Figure 4:
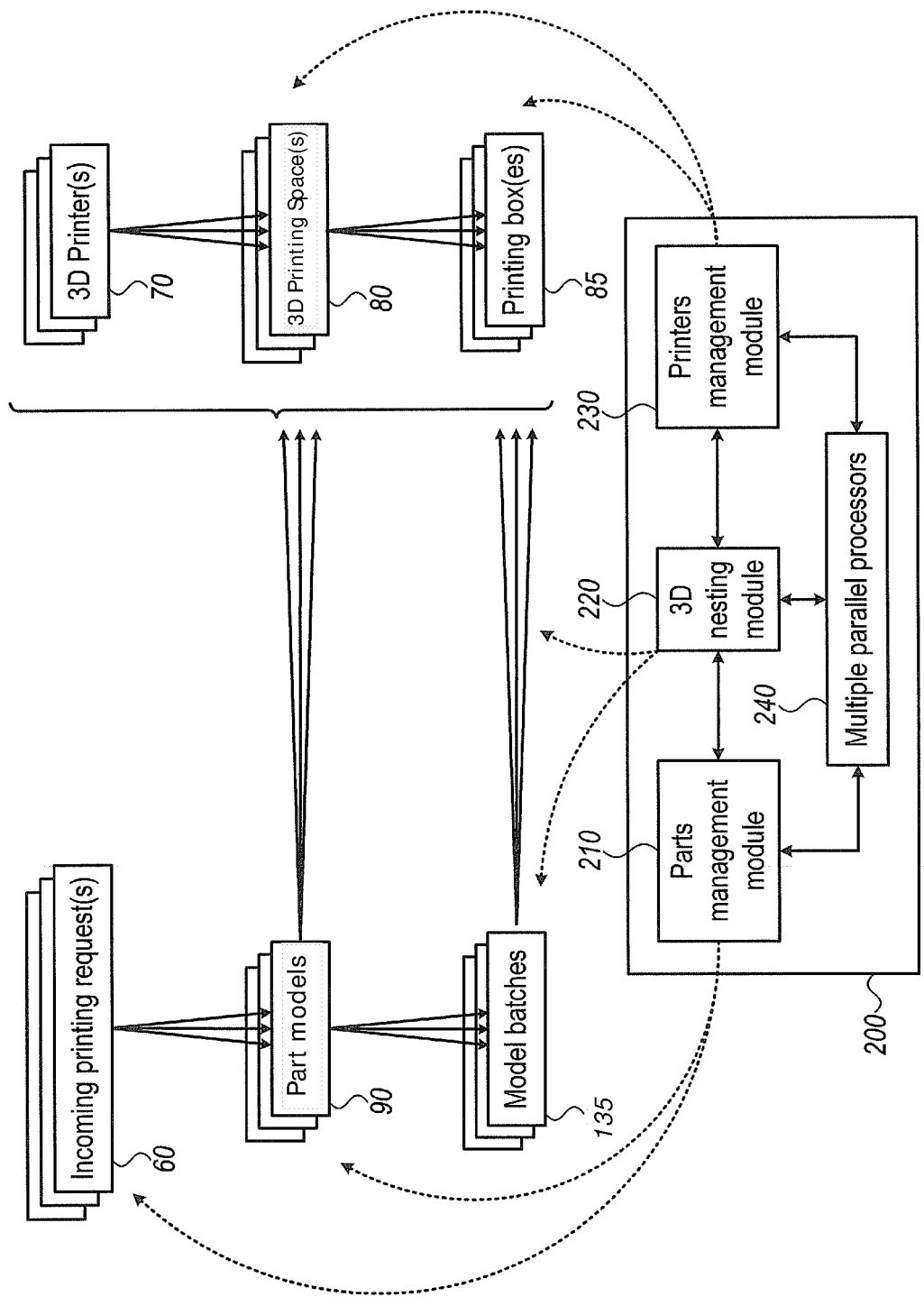
FIG. 4 is a high level schematic block diagram illustrating a highly flexible nesting module for 3D printing that exhibits a high degree of parallelization, according to some embodiments of the invention.

FIG. 4 is a high level schematic block diagram illustrating a highly flexible nesting module 200 for 3D printing that exhibits a high degree of parallelization, according to some embodiments of the invention. Incoming printing request(s) 60 may be received from one or more sources, and include requests for printing any number of parts, possibly using different types of printers 70. A parts management module 210 may arrange incoming printing request(s) 60 into one or more sets of part models 90 and monitor their nesting and possibly their actual printing. Parts management module 210 may also handle splitting received parts into batches (stage 130) according to different criteria prescribed by nesting method 100 (e.g., size ordering, splitting with respect to available printing spaces 80, temporal considerations etc.). A 3D nesting module 220 may handle the actual nesting (stages 140-170). Parts management module 210 as well as 3D nesting module 220 may operate with respect to one or more 3D printers 70 (possibly of different types), one or more printing spaces 80 in each printer 70 and one or more printing boxes (sub-spaces) 85 within each printing space 80, which may in turn be managed by a printers management module 230. Printers management module 230 may be configured to optimize printing resource utilization and provide corresponding parameters (e.g., batch size for specific spaces 80 or boxes 85, specific printing criteria etc.) to 3D nesting module 220, to be incorporated in the performance of method 100. The arrow triplets in FIG. 4 schematically indicate the parallelization possibilities that may be applied by method 100 and module 200, with respect to the many steps of splitting part models and printing areas, either of which may be optimized irrespectively of the other. Such parallel processes may be carried out simultaneously by multiple parallel processors 240.

Parts management module 210 may be configured to receive printing requests comprising part models 90 and split them into model batches 135. Printers management module 230 may be configured to define 3D printing space(s) 80 and possibly printing box(es) 85 therewithin, with respect to 3D printer(s) 70 associated therewith. 3D nesting module 220 may be configured to receive model batches 135 from parts management module 210, set a first batch of part models into 3D printing space(s) 80 and/or respective printing box(es) 85 defined by printers management module 230, and repeatedly, set consecutive model batches into the specified occupied space defined by printing space/box and the formerly set model batches, by defining, for each part model in the model batch, a roadmap with respect to the occupied space and a set of positioning rules, and independently from the other part models in the model batch, and optimizing, in parallel for the part models in the model batch, a part positioning scheme for the model batch parts. The splitting of parts 90 into batches 135 may also be optimized with respect to the defined 3D printing spaces/boxes 80/85. It is noted that printers management module 230 may be configured to receive certain spaces 80 or sub-spaces (boxes 85) as having given parts' arrangements, e.g., provided by a customer. Nesting module 200 may be further configured to enable auctioning of left-over printing space which is free of parts according to the nesting scheme, and offer the left-over printing space for positioning of additional parts.

Nesting module 200 may be configured to implement any of the stages of method 100, and may be implemented at least partially as a computer program product comprising a computer readable storage medium having computer readable program embodied therewith, the computer readable program comprising configured to carry out any of the stages of method 100.

Nesting module 200 may be configured to incorporate scheduling considerations with respect to any of printers 70, printing space(s) 80, printing boxe(es) 85, printing requests 60 and even parts 90 and batches 135. For example, nesting module 200 and method 100 may be configured to incorporate temporal considerations into the nesting procedure, such as absolute or relative required printing times for different part(s) or printing (sub-space(s).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A nesting method for 3D printing, the method comprising:
splitting a plurality of received part models, each part model describing a part that is to be printed by a 3D printer, into a plurality of model batches of the part models,
setting locations and orientations of the part models of a first model batch of said plurality of model batches into a specified 3D printing space of the 3D printer, and
repeatedly, setting each consecutive model batch of said plurality of model batches into a specified occupied space that is defined by the specified 3D printing space and previously set model batches of said plurality of model batches, by:
defining, for each part model in said each consecutive model batch, a roadmap with respect to the occupied space and a set of positioning rules, and independently from the other part models in that consecutive model batch, the roadmap describing availability of a location and orientation for that part model within the specified occupied space, and
optimizing, in parallel for the part models in that model batch, a part positioning scheme for those part models for 3D printing of those part models by the 3D printer in the 3D printing space, wherein the parallel optimizing is carried out by applying PRM (probabilistic roadmap) to generate in parallel a plurality of probabilistic roadmaps representing a plurality of respective part models in the specified 3D printing space, and applying RRT (rapidly-exploring random trees) algorithms to explore configurations of the plurality of part models in the associated plurality of probabilistic roadmaps.

2. The nesting method of claim 1, wherein the parallel optimizing is carried out by applying PRM (probabilistic roadmap) and RRT (rapidly-exploring random trees) algorithms to minimize the height of the part models or maximize the density of the part models.

3. The nesting method of claim 1, wherein defining the roadmap and optimizing the part positioning scheme are carried out repeatedly for different sets of roadmaps to yield a respective plurality of optimization scores, and the setting of the part models is determined with respect to the optimization scores.

4. The nesting method of claim 1, further comprising initially incorporating additional spatial limitations on orientations of the part models, the spatial limitations comprising at least one of: at least one preferred orientation for each part model, convex hull requirements relating to the part models, and support requirements relating to the part models.

5. The nesting method of claim 4, further comprising optimizing an orientation of at least one of the received part models with respect to specified 3D printing requirements, prior to the respective setting and optimizing.

6. The nesting method of claim 1, further comprising incorporating, into the setting and the optimizing, requirements for supports or floating tiles relating to the part models.

7. The nesting method of claim 1, further comprising carrying out the setting and the optimizing with respect to specified rules concerning interlocking of the part models.

8. The nesting method of claim 1, wherein the received part models are grouped into a plurality of part groups prior to the splitting and wherein the splitting into batches is carried out with respect to the part groups.

9. The nesting method of claim 8, further comprising optimizing the grouping of the parts into the part groups with respect to printing requirements and occupied space of the part group.

10. The nesting method of claim 8, wherein the part groups are identical.

11. The nesting method of claim 1, wherein the settings of the model batches and the defining of the roadmaps are carried out with respect to 4DOF (four degrees of freedom) of the part models.

12. The nesting method of claim 1, wherein the settings of the model batches and the defining of the roadmaps are carried out with respect to 6DOF (six degrees of freedom) of the part models.

13. A modular 3D printing method comprising:
receiving an allocation of a 3D printing space, comprising a plurality of box-shaped sub-spaces which fill at least part of the 3D printing space, and
carrying out the nesting method of claim 1 with respect to at least one of the box-shaped sub-spaces.

14. The method of claim 13, wherein the nesting method is carried out with respect to a plurality of the box-shaped sub-spaces, and further comprising allocating an obtained ensemble of part models into a plurality of groups of part models, each group allocated to a respective box-shaped sub-space.

15. The method of claim 14, further comprising carrying out the allocation of the obtained ensemble into groups concurrently with the setting of the part models into the respective box-shaped sub-spaces and the optimizing of the part positioning schemes.

16. A 3D printing management method comprising:
allocating an obtained ensemble of part models into a plurality of groups of part models, each group allocated to a respective 3D printer, and carrying out the nesting method of claim 1 with respect to at least one of the groups.

17. The method of claim 16, further comprising carrying out the allocation of the obtained ensemble into groups concurrently with the setting of the part models into the specified 3D printing space of the respective 3D printer and the optimizing of the part positioning schemes.

18. A system for nesting 3D printing, comprising:
at least one processor; and
at least one memory configured to store one or more code sets, which cause the at least one processor:
receive printing requests comprising a plurality of part models, each part model describing a part that is to be printed by a 3D printer of the system, and split the plurality of received part models into a plurality of model batches of the part models,
define at least one 3D printing space with respect to at least one 3D printer associated therewith, and
receive the plurality of model batches from the parts management module, set a first batch of the plurality of part models into the at least one 3D printing space defined by the printer management module, and repeatedly, set each consecutive model batch of the plurality of model batches into a specified occupied space that is defined by the specified 3D printing space and previously set model batches of the plurality of model batches, by:

defining, for each part model in the each consecutive model batch, a roadmap with respect to the occupied space and a set of positioning rules, and independently from the other part models in that consecutive model batch, the roadmap describing availability of a location and orientation for that part model within the specified occupied space, and optimizing, in parallel for the part models in that model batch, a part positioning scheme for those part models for 3D printing of those part models by the 3D printer in the 3D printing space, wherein the parallel optimizing is carried out by applying PRM (probabilistic roadmap) to generate in parallel a plurality of probabilistic roadmaps representing a plurality of respective part models in the specified 3D printing space, and applying RRT (rapidly-exploring random trees) algorithms to explore configurations of the plurality of part models in the associated plurality of probabilistic roadmaps.

19. The system of claim 18, wherein the at least one processor is further configured to optimize the splitting of the received part models into the model batches with respect to the at least one defined 3D printing space.

20. The system of claim 18, wherein the at least one processor comprises multiple parallel processors to simultaneously carry out the parallel optimization of the plurality of part models.

21. A non-transitory computer readable storage medium having a computer readable program embodied therewith, the computer readable program configured to carry out the method of claim 1.

* * * * *